United States Patent [19]
Urai

[11] 4,291,856
[45] Sep. 29, 1981

[54] ASSEMBLY OF A SEAT FRAME, SLIDE RAILS AND A LOCKING DEVICE

[75] Inventor: Muneharu Urai, Tokyo, Japan

[73] Assignee: Tachikawa Spring Co. Ltd., Tokyo, Japan

[21] Appl. No.: 82,328

[22] Filed: Oct. 5, 1979

[30] Foreign Application Priority Data

Oct. 9, 1978 [JP] Japan .................. 53-123564

[51] Int. Cl.³ .................................... A47C 29/00
[52] U.S. Cl. ........................... 248/429; 248/393; 297/311; 308/3 R
[58] Field of Search ............ 248/329, 324, 393, 429, 248/424, 395, 396; 308/3 R, 3.6; 297/317, 311, 314

[56] References Cited
U.S. PATENT DOCUMENTS

| 3,136,524 | 6/1964 | Pickles | 248/424 |
| 3,189,313 | 6/1965 | Burns et al. | 248/429 |
| 3,381,927 | 5/1968 | Stamates | 248/429 |
| 4,072,375 | 2/1978 | Boone | 308/3.6 |
| 4,088,378 | 5/1978 | Pallant | 308/3.6 |
| 4,154,422 | 5/1979 | Muhr | 248/429 |
| 4,168,051 | 9/1979 | Terada | 248/429 |

Primary Examiner—James T. McCall
Attorney, Agent, or Firm—Oldham, Oldham, Hudak & Weber Co.

[57] ABSTRACT

In an assembly of a seat frame for an automobile seat, slide rails therefor enabling the longitudinal adjustment of the seat position, and a locking device therefor, the slide rails, particularly the upper slide rail, is contained within the seat frame, and the locking device is mounted on the seat frame.

8 Claims, 11 Drawing Figures

FIG. I
PRIOR ART
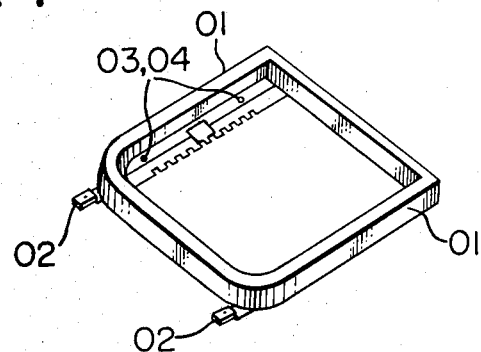
FIG. 2
PRIOR ART
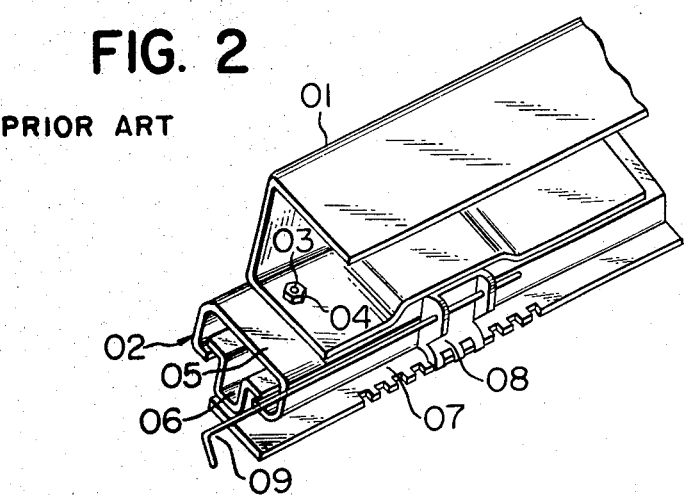
FIG. 3
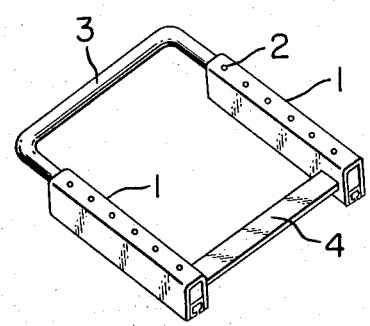

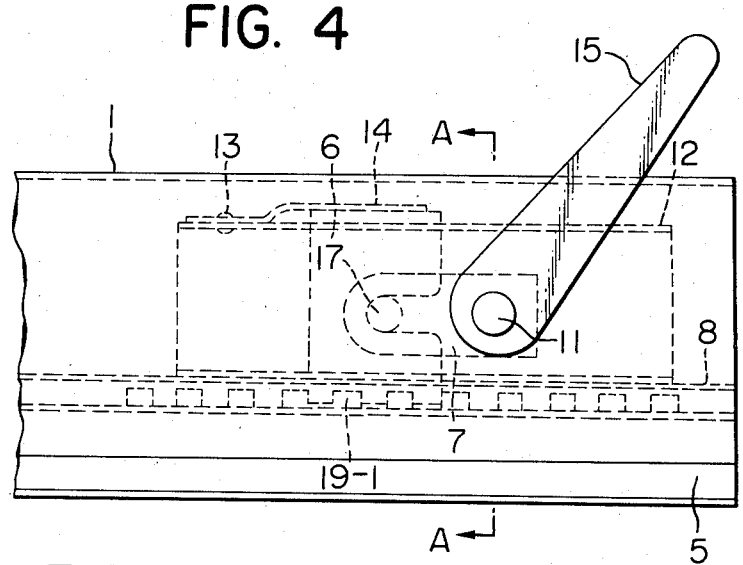
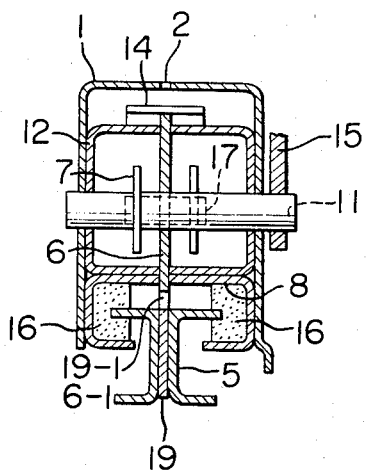
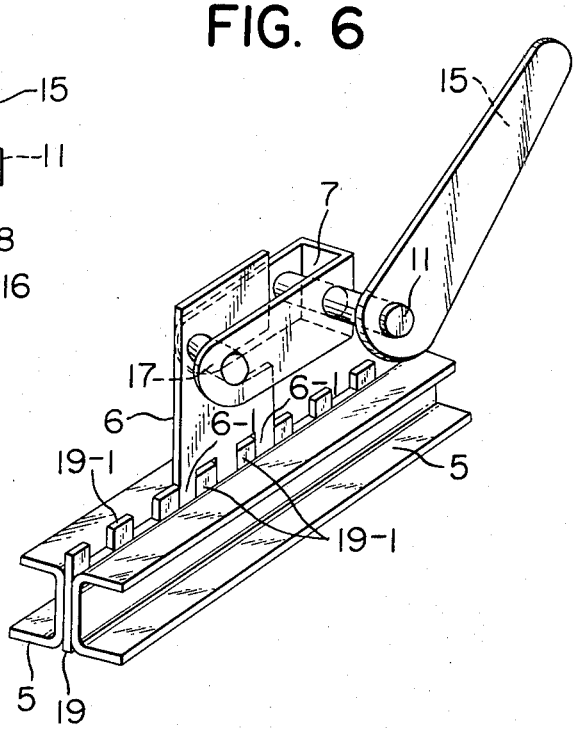

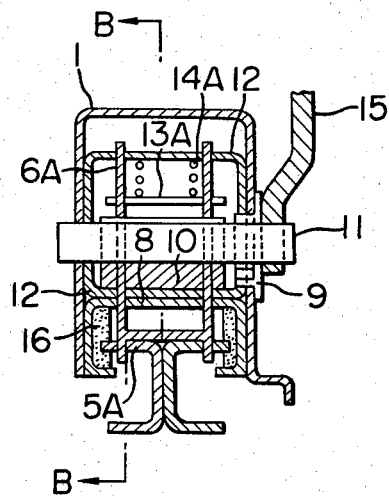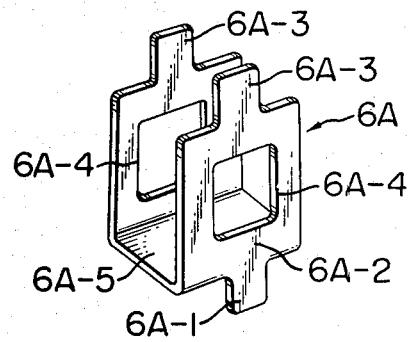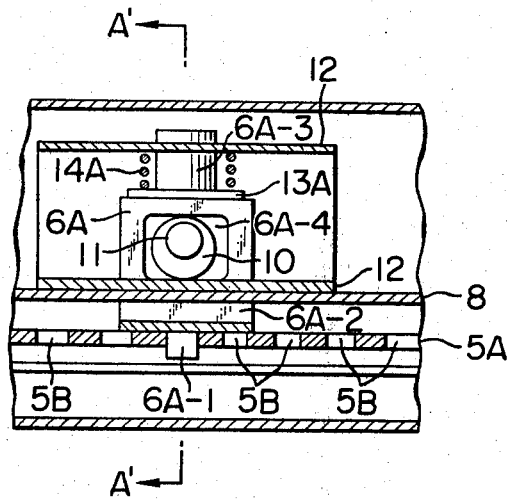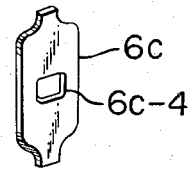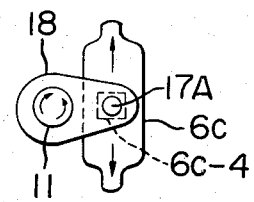

ASSEMBLY OF A SEAT FRAME, SLIDE RAILS AND A LOCKING DEVICE

BACKGROUND OF THE INVENTION

This invention relates to an assembly of a seat frame for an automobile seat, slide rails arranged in the seat frame for enabling the adjustment of the seat location in the longitudinal direction of the automobile, and a locking device for locking the slide rails.

A conventional assembly as shown in FIGS. 1 and 2 in which a seat frame, slide rails and a locking device are illustrated in a perspective view. In FIG. 1, a reference numeral 01 shows a seat frame for mounting a cushion body thereon. Slide rails 02 are secured to the under-surface of the seat frame 01 by means of bolts 03 and nuts 04, for allowing the adjustment of the seat position in the longitudinal direction of the automobile. The slide rails 02 are usually composed of a lower rail 06 and an upper rail 05 which slidably engages with the lower rail 06, as shown in FIG. 2. The abovementioned seat frame 01 is secured to the upper rail 05 and moved in the longitudinal direction in accompany with the movement of the upper rail 05. The lower rail 06 is fixed to a chassis by a suitable bracket not shown.

In order to hold the seat at an appropriate position after the upper rail 02 has been moved, it is necessary to arrange a device for locking the upper rail in relation to the lower rail. Although there may be a number of types of such locking devices, a most fundamental one is shown in FIG. 2. In this conventional locking device, an engaging member 07 partly having a tooth portion is welded to the lower rail 06, and a stopper 08 having a tooth portion at its lower end is secured to a shaft of a lever 09 for allowing swinging movement in relation to the upper rail 05. The tooth portion of the stopper 08 can mesh with the tooth portion of the engaging member 07 for holding the seat in position. Thus, the movement of the seat in the longitudinal direction and the holding thereof can be governed by the engagement and disengagement between the tooth portion of the stopper 08 and that of the engaging member 07.

The seat frame 01 for mounting a seat thereon, and slide rails 02 are separately manufactured and assembled with each other by the bolts 03 and nuts 04 in the final manufacturing stage. Accordingly, the locking device is secured to the slide rails 02, and the assembling of the seat frame 01 and the slide rails 02 necessitates redundant parts and works. Moreover, the superposed arrangement of the seat frame 01 and the slide rails 02 produces increase of the total weight and cost, and also problems in quality.

STATEMENT OF OBJECTS

The present invention has for its object to overcome the abovementioned defects, and to provide a new assembly of a seat frame, slide rails and a locking device, which assembly is inexpensive and strong in structure.

It is a major objective of this invention to provide an assembly of a seat frame, slide rails and a locking device, which comprises a rectangular side frame for mounting a cushion material thereon, said rectangular side frame being opened at its lower face, a rectangular upper rail welded at the lower portion of said side frame partly opening at its lower face, said upper rail having therein sliders with inward grooves, a rectangular reinforcing casing arranged in said side frame above said sliders, said reinforcing casing having slots at its upper and lower faces, a pair of C-shaped lower rails arranged in back-to-back relation with each other and fixed to a chassis of an automobile, said lower rails being slidably engaging with said grooves of said sliders for allowing the longitudinal movement of said sliders, said lower rails also having a tooth engaging portion at an upper portion thereof, a stopper inserted into said slots of said reinforcing casing and having teeth engageable with said tooth engaging portion at its lower end, said stopper being movable vertically by the action of a handle, thereby enabling the longitudinal movement of said side frame and the engagement between said teeth and tooth engaging portion at any position to hold the seat at the selected position. The stopper and the teeth thereon and the reinforcing casing with the slots therein constitute the locking device which is concealed within the seat frame, such concealed locking device being engagable with the tooth engaging portions of the lower rails.

Other features and advantages of this invention will be apparent from the following description taken in connection with the accompanying drawings wherein:

BRIEF DESCRIPTION OF DRAWINGS

FIG. 1 is a perspective view of a conventional seat frame and its slide rail;

FIG. 2 is an enlarged perspective view of a portion of an assembly of the seat frame, slide rails and a locking device;

FIG. 3 is a perspective view of a seat frame embodying this invention;

FIG. 4 is an enlarged side view of a portion of the seat frame shown in FIG. 3;

FIG. 5 is a section taken along the line A—A in FIG. 4;

FIG. 6 is a perspective view for showing the locking device only;

FIG. 7 is a section for showing the structure of a second embodiment of this invention;

FIG. 8 is a section taken along the line B—B in FIG. 7;

FIG. 9 is a perspective view of a stopper to be used in the second embodiment;

FIG. 10 is a perspective view of a modification of the stopper; and

FIG. 11 is a front view of the stopper mechanism used the modification.

DETAILED DESCRIPTION

Now, the first embodiment shown in FIGS. 3 to 6 will be explained in detail.

As shown in FIG. 3, a seat frame is composed of a pair of spaced side members 1 and 1 which are connected with each other by a front member 3 and a rear member 4. On the upper surfaces of the side members 1, 1, there are formed a number of holes 2 for securing a plurality of springs (not shown) therein. For example, zigzag springs forming a cushion for the seat are parallelly arranged transversely between the side members 1, 1.

As shown in FIGS. 4 and 5, the side frame 1 is an inverted U-shaped member of which lower side is open, and has a number of spring securing holes 2 on its closed upper side. An upper rail 8 is inserted from the open lower end of the side frame 1 and welded thereto. The C-shaped upper rail 8 has a partly opened lower side. Within the both lateral portions of the upper rail 8, sliders 16 of a high molecular material is bonded to the upper rail by heating or other suitable method. The slider 16 has a groove for receiving or slidably fitting an upper arm of a C-shaped lower rail 5 therein. Also, the upper surface of the upper rail 8 has a slot for allowing the insertion of a vertically movable stopper 6 which will be mentioned hereinafter.

In the seat frame, there is provided with a reinforcing casing 12 of substantially square section upwards of the upper rail 8. The reinforcing casing 12 is integrally welded to the upper rail 8 and/or the side frame 1. In the upper and lower surface of the reinforcing casing 12, there are provided slots for allowing the vertical movement of the stopper 6, the same as in the upper rail 8.

As shown in FIG. 6 in detail, the lower rails 5 are C-shaped members arranged in the back-to-back relation with each other, sandwiching therebetween an engaging member 19 which has teeth 19-1 at its upper portion. These members 1 and 19 are welded to form an integral body, and positioned to fit the upper arms of the lower rails 5 in the groove of the abovementioned slider 16, as shown in FIG. 5. The stopper 6 is a rectangular plate having teeth 6-1 which are meshed with the teeth 19-1 of the engaging member 19 at its lower portion and a slot for receiving a pin 17 at its middle portion. The engaging member 19 may be dispensed with, if a plurality of holes are formed in the upper arm of one of lower rails 5 for fitting with the teeth of the stopper 6.

The stopping mechanism comprises a generally U-shaped lever 7, a shaft 11 and a handle 15, and the pin 17 extends between the open ends of the arms of the lever 7 and engages the slot of the stopper 6. The pin 17 extends to and is pivotally supported on the side frame 1. By virtue of the abovementioned structure, the lever 7 can be swingably moved by the action of the handle 15. Such movement of the lever 7 moves the stopper 6 in the vertical direction by means of the pin 17, and therefore the teeth 6-1 are brought in engagement with or out of engagement with the teeth 19-1 of the engaging member 19. Instead of the U-shaped lever 7, there may be used a flat plate whose one end is fixed to the shaft 11 and the other end is horizontally inserted into the slot of the stopper 7 (in lieu of the pin 17).

The upper end of the stopper 6 is abutted with a leaf spring (FIG. 4) fixed to the upper surface of the reinforcing casing 12 by means of a rivet 13 for urging the stopper 6 downwards when the handle 15 is released for enabling the meshing engagement between the teeth 6-1 and 19-1.

When the handle 15 is lowered, the stopper 6 is moved upwards by means of the lever 7 and the pin 17. Accordingly, the engagement between the teeth 6-1 and 19-1 is released for enabling the movement of the seat frame. When the handle 15 is released, the stopper 6 is engaged with the engaging member 19 by the action of the leaf spring 14 for holding the seat in position.

FIGS. 7 through 9 show a second embodiment of this invention.

In the second embodiment, side frame 1, a upper rail 8, a reinforcing casing 12 and so on are materially the same as those in the abovementioned first embodiment, and so their detail explanations are withheld. A stopper 6A is of U-shape in its section having upper projections 6A-3, lower projections 6A-1 and middle rectangular or polygonal openings 6A-4. On the other hand, engaging hole 5B are formed at the upper arm of a lower rail 5A as shown in FIG. 8, the lower projections 6A-1 of the stopper 6A can be brought in engagement with and out of engagement with the engaging holes 6A according to the up-and-down movement of the stopper 6A. Therefore, the engaging member 19 of the first embodiment can be dispensed with in the second embodiment. For enabling the up-and-down movement of the stopper 6A, slots are provided with in the upper and lower surface of the upper rail 8 and the reinforcing casing 12. Also, a spring 14A is arranged between a spring retainer 13A and the inner surface of the reinforcing casing 12.

A cam 10 is fixed to a shaft 11 of a handle 15. The cam 10 abuts with the polygonal opening 6A-4 of the stopper 6A.

When the handle 15 is rotated in either direction, the cam 10 is rotated through the shaft 11, the stopper 6A is moved upwards by the action of cam 10 and at the same time the lower protrusions 6A-1 of the stopper 6A are disengaged from the engaging holes 5B of the lower rails 5A. Thus, the lock is released, and so the side frames 1, and accordingly the seat mounted thereon, can be moved in its longitudinal direction. At an appropriate selected position of the seat, the handle 15 is released to again lock it by the reaction of the spring 14A, thereby the seat is held in the new position.

FIGS. 10 and 11 show a modification of the stopper and its vertically moving mechanism.

A stopper 6C somewhat resembles to the stopper 6A shown in FIG. 9, although it is a single flat member. It has upper and lower projections and middle rectangular opening 6C-4. As shown in FIG. 11, the lever 18 is fixed to the shaft 11 which is rotated by the handle. At the other end of the lever 18, there is welded a pin 17A which is inserted into the rectangular opening 6C-4. By the manipulation of the handle, the lever 18 can be swinged to lift or lower the stopper 6C for enabling the locking and unlocking of the seat, as in the foregoing embodiments.

By virtue of the abovementioned structures and functions, the assembly of this invention can be manufactured by decreased steps in comparison with those of the conventional one. The integral assembly of this invention is light in weight, simple and strong in construction, and effective in function.

While several complete embodiments of the invention have been disclosed herein, it will be appreciated that modification of these particular embodiments of the invention may be resorted to without departing from the scope of the invention.

What is claimed is:

1. An assembly of a seat frame, slide rails and a locking device, which comprises a rectangular side frame for mounting a cushion material thereon, said rectangular side frame being opened at its lower face, a rectangular upper rail secured within the lower portion of said side frame, said side rail being partly open at its lower face said upper rail having therein sliders with inwardly open grooves, a rectangular reinforcing casing arranged in said side frame above said sliders, said reinforcing casing having slots at its upper and lower faces, a pair of C-shaped lower rails arranged in back-to-back relation with each other and fixed to a chassis of an automobile, said lower rails being slidably engaging with said grooves of said sliders for allowing the longitudinal movement of said upper rail and side frame, said lower rails also having upper tooth engaging portion thereon, a stopper inserted into said slots of said reinforcing casing and having teeth engageable with said tooth engaging portion at its lower end, said stopper with teeth and said reinforcing casing with slots constituting said locking device which is concealed within the inner space of said seat frame, said concealed locking device being engageable with said tooth engaging portion formed in said pair of C-shaped lower rails, said stopper being movable vertically by the action of a handle, thereby enabling the longitudinal movement of said side frame and the engagement between said teeth and tooth engaging portion at any position to hold the seat at the selected position.

2. An assembly as claimed in claim 1, wherein said tooth engaging portion is formed as teeth projecting from the upper arm of said lower rail.

3. An assembly as claimed in claim 1, wherein said tooth engaging portion is formed as holes drilled in the upper arm of said lower rail.

4. An assembly as claimed in claim 1, wherein said stopper is a generally U-shaped member having upper and lower projections and a middle polygonal opening for slidably abutting with a cam, and there are arranged a plurality of holes in the upper arm of said lower rail for receiving said lower projection and slots in the upper and lower side of said reinforcing casing for allowing the vertical movement of said stopper when said cam is actuated.

5. An assembly as claimed in claim 1, wherein said stopper is a single flat plate having a central opening and upper and lower projections.

6. An assembly of a seat frame, slide rails and a locking device, which comprises a rectangular side frame for mounting a cushion material thereon, said rectangular side frame being open at its lower face, a rectangular upper rail secured within said side frame at the lower portion thereof, said upper rail being partly open at its lower face, said upper rail having a pair of spaced sliders with inwardly open grooves positioned therein, a rectangular reinforcing casing secured in said side frame above said sliders, said reinforcing casing having slots at its upper and lower faces, a pair of C-shaped lower rails arranged in operative back-to-back relation with each other and adapted to be fixed to a chassis of an automobile, said lower rails being adapted to slidably engage with said grooves of said slider for allowing the longitudinal movement of said upper rail, said lower rails also having a tooth engaging portion on its upper portion, a stopper carried in said slots of said reinforcing casing for sliding vertical movement and having teeth at its lower end engageable with said tooth engaging portion, said stopper with teeth and said reinforcing casing with slots constituting said locking device which is concealed within the inner space of said seat frame, said concealed locking device being engageable with said tooth engaging portion formed in said pair of C-shaped lower rails, said stopper being movable vertically by the action of a control member which can release said stopper thereby enabling longitudinal movement of said side frame and the engagement between said teeth and tooth engaging portion by movement of the control member at any position to hold the seat at a selected position.

7. An assembly as claimed in claim 6, wherein said tooth engaging portion is formed as teeth projecting from the upper portion of said lower rail.

8. An assembly as claimed in claim 6, wherein said tooth engaging portion is formed as holes formed in the upper portion of said lower rail.

* * * * *